United States Patent
Mo

[19]
[11] Patent Number: 6,137,875
[45] Date of Patent: Oct. 24, 2000

[54] SYSTEM AND METHOD TO MINIMIZE GLARE IN INTEROFFICE TRUNK ALLOCATION

[75] Inventor: Chi-Chiang Mo, Lisle, Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,926

[22] Filed: May 30, 1997

[51] Int. Cl.$^7$ ............................................. H04M 7/00
[52] U.S. Cl. .................................. 379/241; 379/229
[58] Field of Search ................................ 379/219, 229, 379/240, 241

[56] References Cited

U.S. PATENT DOCUMENTS

| | | | |
|---|---|---|---|
| 3,210,477 | 10/1965 | Lummis | 379/241 |
| 3,491,213 | 1/1970 | Gilboy et al. | 379/241 X |
| 3,637,946 | 1/1972 | Hamrick | 379/241 |
| 3,700,822 | 10/1972 | Fritschi | 379/241 |
| 4,017,690 | 4/1977 | Rosing | 379/241 |
| 4,866,708 | 9/1989 | Ardon et al. | 370/381 |
| 5,046,181 | 9/1991 | Higuchi et al. | 379/241 X |
| 5,304,129 | 3/1970 | Ewin et al. | 379/241 |

FOREIGN PATENT DOCUMENTS

| | | | |
|---|---|---|---|
| 0005687 | 11/1979 | European Pat. Off. | H04M 7/10 |
| 0389887 | 10/1990 | European Pat. Off. | H04M 7/10 |
| 2327691 | 8/1974 | Germany | H04M 7/10 |
| 56117466 | 9/1981 | Japan | H04M 7/00 |

*Primary Examiner*—Harry S. Hong
*Attorney, Agent, or Firm*—Michael B. Johannesen

[57] ABSTRACT

A system and method for allocating trunks in order to minimize glare. Trunk groups between switches are subdivided and each subgroup uses different allocation algorithms. A first switch hunts a first subgroup using a first algorithm and the second subgroup using a second algorithm. The switch on the other end of the trunk uses the second algorithm to hunt on the first trunk subgroup, and the first algorithm to hunt on the second trunk subgroup. In order to minimize glare, a determination can be made that one of the two algorithms will have precedence, i.e., if both switches seize the same trunk, then the switch using the algorithm of higher precedence to set up its call.

7 Claims, 4 Drawing Sheets

SYSTEM AND METHOD TO MINIMIZE GLARE IN INTEROFFICE TRUNK ALLOCATION

TECHNICAL FIELD

This invention relates to the field of telephony and, more specifically, to the area of allocation of trunks between telephone switching systems.

BACKGROUND OF THE INVENTION

Telephone exchanges, also known as switching offices or simply switches, are connected to each other by means of trunks. These trunks (known in the art as a "trunk group") may connect a switch to another switch, to a tandem switch or to a long distance network switch. When a switch determines that a call must be routed to or through another switch, the switch sets up a trunk in the appropriate trunk group to connect the switch and the destination (or intermediary) switch. In the art, the selection process is known as "hunt". A switch "seizes" a free trunk between itself and the destination switch. The originating switch will then signal to the destination switch that the trunk has been seized. This signaling may be on the trunk itself or through a separate signaling network. The destination switch then allocates that seized trunk to the call and extends the call, either to a destination or to another switch.

Most inter office trunks are bi-directional. That is, one portion of the trunk delivers voice or data to the destination switch and the destination switch uses the other portion of the trunk to deliver voice or data to the originating switch. A known problem in the art is that of "glare" in bi-directional trunks. Glare occurs when two switches seize the same trunk for two different telephone calls at roughly the same time. Such glare conditions cause calls to be delayed in setup or may even cause an origination to fail. There have been many attempts to alleviate the glare problem, however, the problem is still present in current switching networks.

SUMMARY OF THE INVENTION

This problem is solved and a technical advance is achieved in the art by a system and method for hunting and seizing trunks in order to minimize glare. This is achieved through subdividing trunk groups and using different hunting algorithms for each trunk subgroup in each of the two switches. A first switch hunts a first subgroup using a first algorithm and the second subgroup using a second algorithm. The switch on the other end of the trunk uses the second algorithm to hunt on the first trunk subgroup, and the first algorithm to hunt on the second trunk subgroup. Further, one of the two algorithms is designated as having precedence, i.e., if both switches still seize the same trunk, then the switch using the higher precedence algorithm seizes the trunk and sets up its call.

In an exemplary embodiment of this invention, two switches are connected via a trunk group containing, for purposes of describing this invention, six individual members. This trunk group is then broken into two subgroups comprising three members each. In the first switch, the first subgroup is selected in a first-in-first-out (FIFO) manner and the second subgroup is selected in a last-in-first-out (LIFO) manner. In the second switch, the first subgroup is selected in a LIFO manner and the second subgroup is selected in a FIFO manner. Advantageously, the subgroup being selected using the FIFO system takes precedence over the LIFO. In this manner, there is a much less likelihood of instances of glare, because trunks released at the same time will be in a different order in the allocation scheme for the next selection process.

BRIEF DESCRIPTION OF THE DRAWINGS

A more complete understanding of the invention may be obtained in consideration of the following description in conjunction with the drawings in which.

DETAILED DESCRIPTION

Figure 1:
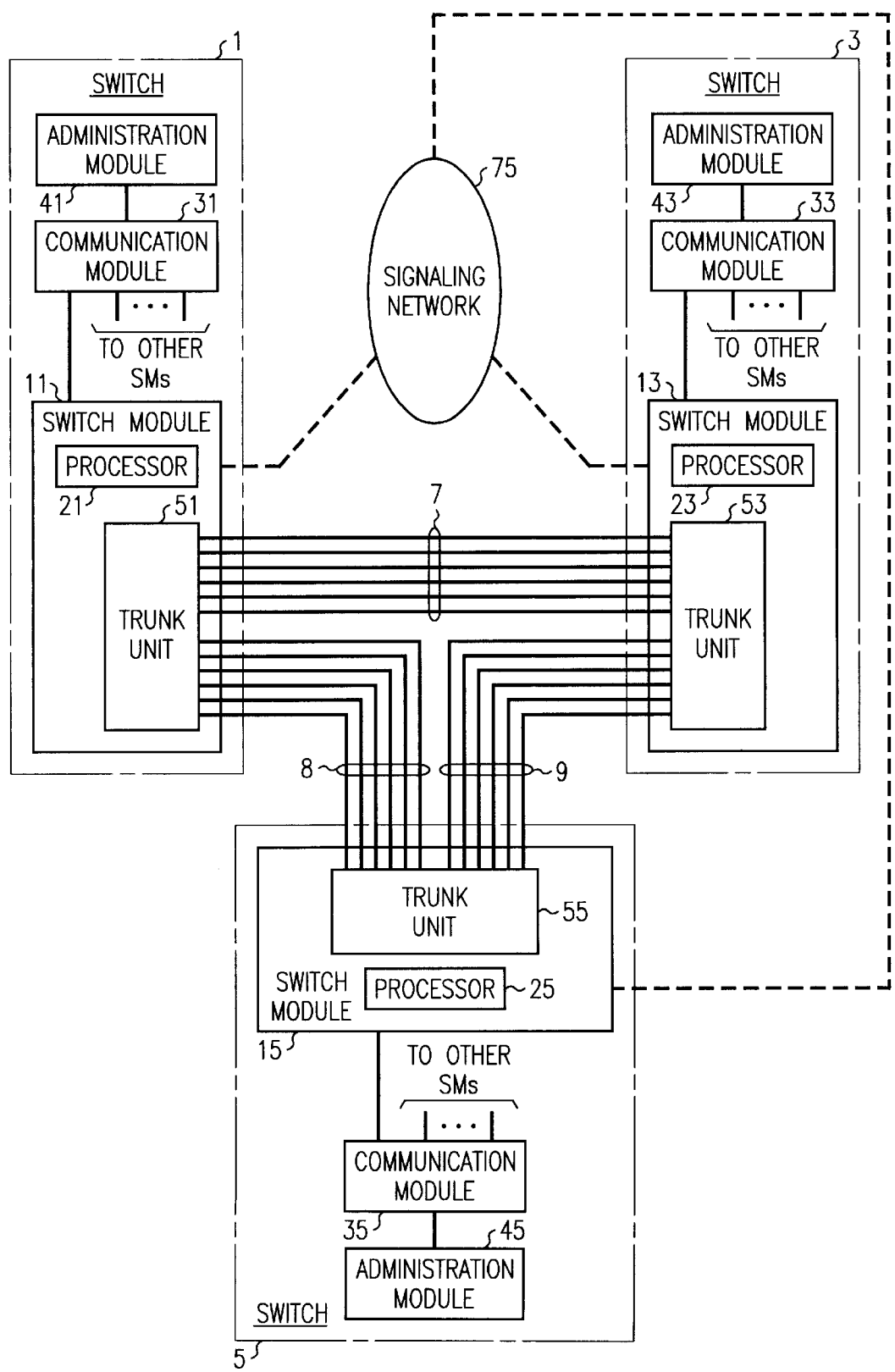
FIG. 1 is a block diagram of exemplary network of switching systems employing the trunk allocation algorithm of this invention.

FIG. 1 illustrates a simplified telephone switching network employing an exemplary embodiment of the current invention. In this telephone network, there are three switches, 1, 3, and 5. These switches are interconnected via trunks which are configured in trunk groups, so that switches 1 and 3 are connected by trunk group 7, switches 1 and 5 are connected by trunk group 8, and switches 3 and 5 are connected by trunk group 9. Illustratively, switches 1, 3, and 5 may be distributed control, analog or digital switches, such as a 5ESS® switch manufactured by Lucent Technologies and described in the AT&T Technical Journal, vol. 64, No. 6, July–August, 1985, pp. 1303–1564. Illustratively, switches 1, 3, and 5 include aplurality of switch modules (SMs) 11, 13, and 15, respectively, each associated with a different set of telephone station sets or trunks. Each SM includes a processor 21, 23, and 25 for controlling connections to and from its associated telephone station sets and trunks. The architecture of each switch 1, 3, and 5 includes a communication module 31, 33, and 35 as a hub with the plurality of switching modules and an administrative module 41, 43, and 45, emanating therefrom. To complete the description of switches 1, 3, and 5, communications modules 31, 33, and 35 act as a switch fabric for communication among switch modules and their respective administrative module 41, 43, or 45. Administrative modules provide coordination of functional components of the respective switches and a human machine interface.

Each SM 11, 13, and 15 includes one or more line units and trunkunits. For purposes of describing this invention, each SM 11, 13, 15 contains at least one trunk unit 51, 53, and 55, respectively. Trunk units 51, 53, and 55 connect and disconnect trunks among the various switches. Optionally, switches may communicate on a signaling network 75 (such as a CCS 7 network) as is known in the art.

In setting up an inter-switch call, for example, between switch 1 and switch 3, a determination is made in switch 1 that the interconnecting trunks to switch 3 are connected to trunk unit 51 and SM 11. The call is, therefore, routed through CM 31 (if necessary) to SM 11. AM 41 determines which trunk in trunk group 7 is available, if any, for allocation to this call. The process for allocation ("hunting") will be discussed further below in connection with FIGS. 2 and 3. Once a trunk of trunk group 7 has been selected, the trunk is "seized" and, according to this embodiment of this invention, a message including the group and member numbers of that seized trunk is sent through signaling network 75 to switch 3. SM 13, the AM 43 marks the trunk "in use" and completes the call, according to the prior art.

According to the prior art, if AM 41 seized a member of trunk group 7, and AM 43 seized the same member of group 7 simultaneously, a glare condition occurs and various techniques as known in the art would be used in order to resolve this condition. Alternatively, both calls may fail (routed to fast busy signal). According to an exemplary embodiment of this invention, however, the likelihood of glare is reduced significantly.

Figure 2:
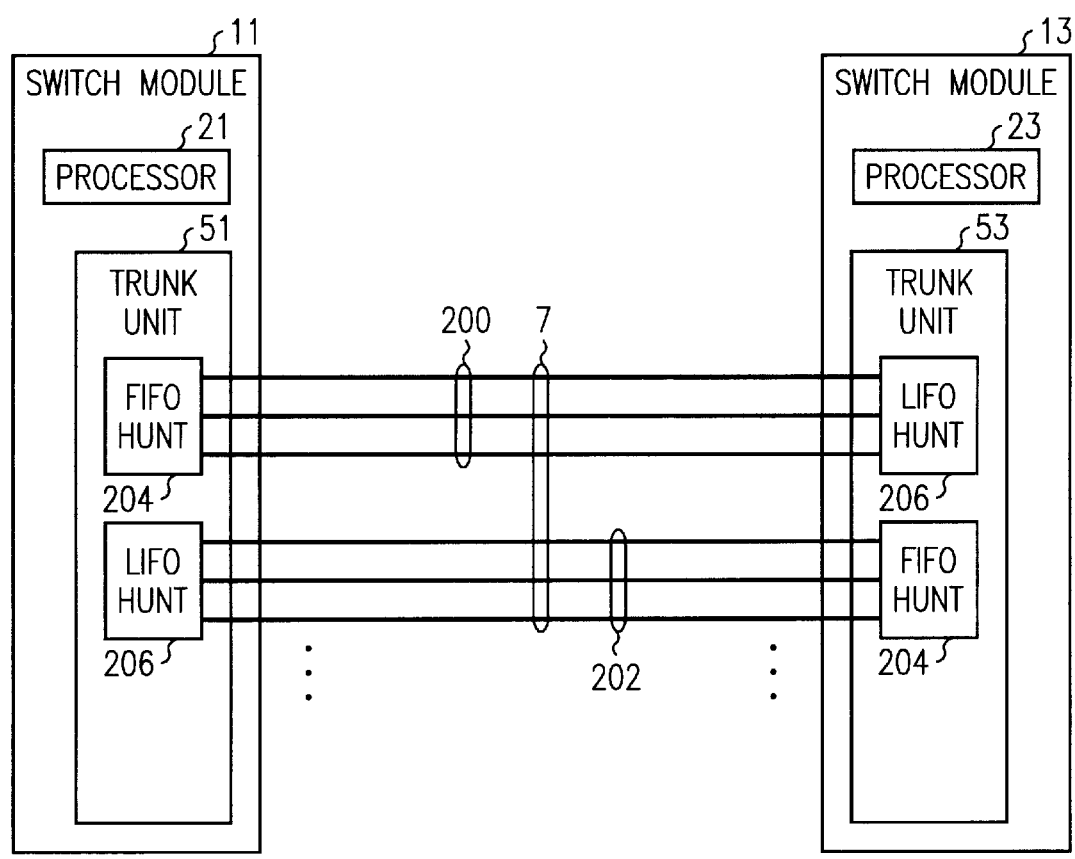
FIG. 2 is a more detailed illustration of a block diagram of this invention showing subgrouping of the trunks.

Turning now to FIG. 2, allocation of trunks between trunk unit 51 and trunk unit 53 of FIG. 1 is illustrated. The trunk group herein comprises six trunks (there may be more or fewer according to the engineering of the network) and are divided into two equal subgroups of three. Again, these groupings may be varied according to traffic patterns between the offices without departing from the scope of this invention. There may be as many or as few trunks in each subgroup according to traffic patterns. In an extreme case, a subgroup may have all trunks in a subgroup, with that subgroup having higher precedence, if the majority of traffic originates from that switch. The switch on the other end of the trunk group, then, has all members of a trunk group in the lower precedence subgroup.

According to one exemplary embodiment of this invention, subgroup 200 is hunted in a first-in-first-out (FIFO) manner in trunk unit 51 by processor 21 and subgroup 202 is hunted in a last-in-first-out (LIFO) manner by processor 21. In trunk unit 53, the algorithms are reversed. That is, subgroup 200 is hunted in a LIFO manner and trunk subgroup 202 is hunted in a FIFO manner. In this way, when a trunk is released, it does not reach the end (or beginning) of the free lists in both systems at the same time, and, therefore, there is a better chance that the trunk will not be seized at the same time in the future. Subdivision of trunk groups is new in the art and searching via opposite algorithms at either end is also a contribution to the art by this invention.

Further, one of these hunting algorithms is designated as having precedence. Therefore, a switch will hunt a FIFO subgroup first, and then, if there are no free members in the FIFO subgroup, the switch will hunt the LIFO subgroup. In this manner, glare conditions are minimized, because both ends of a trunk group start to hunt an idle trunk from separate subgroups. These hunting algorithms are exemplary, and, thus, any algorithm may be used without departing from the scope of this invention. For example, Forward Linear (selects an idle trunk on ascending member number) and Backward Linear (selects an idle trunk on descending member number) may be used. The central point is that there are a plurality of trunk subgroups, each hunted in a different manner at each end, and that one of the hunting algorithms has precedence.

Figure 3:
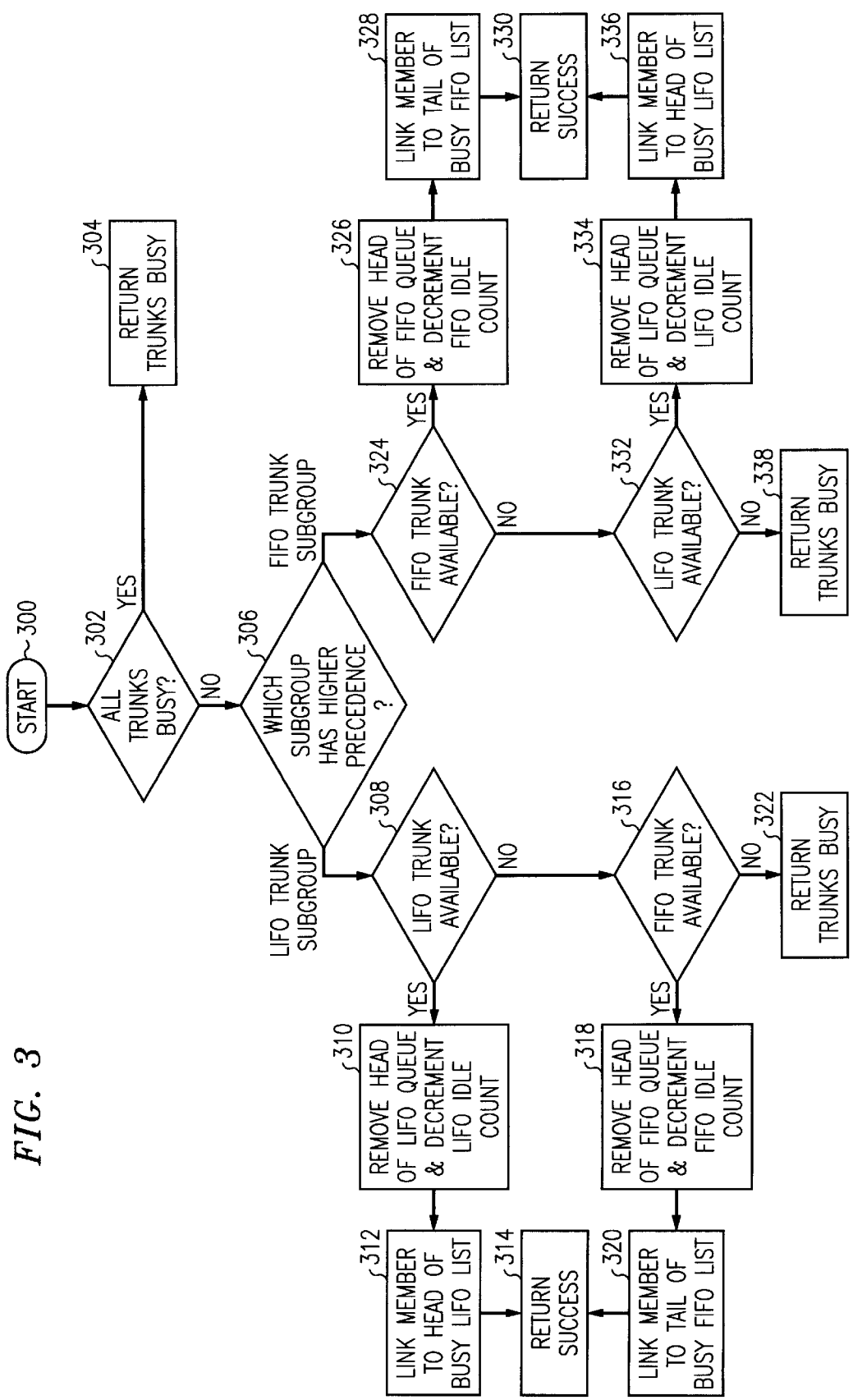
FIGS. 3 and 4 are flow charts of allocation and deallocation, respectively, of the trunks according to this invention.

Turning now to FIG. 3, a flow chart of selection of trunks as practiced in AM 41, for example, or any of the other processors is described. Processing starts at circle 300 and proceeds to decision diamond 302. A determination is made in decision diamond 302 whether all trunks are busy. If all trunks are busy, then this function returns an all trunk busy indication 304 and the call is routed to an all trunk busy signal (fast busy).

If all trunks are not busy in decision diamond 302, then a decision is made in decision diamond 306 which algorithm has precedence in this switch. The algorithm having precedence is determined by agreement between the two switches. If, for example, the trunk group is a LIFO trunk group (that is searched last-in-first-out), then a determination is made in decision diamond 308 whether a trunk is available on the LIFO free list. If it is, then processing proceeds to action box 310 where the head of the LIFO queue is removed (seized or allocated) and the LIFO idle count is decremented. Processing proceeds to box 312 where the member is linked to the head of the busy LIFO list. Processing ends at box 314 where success is returned (along with the trunk group and member number).

If, in decision diamond 308, no LIFO trunk was available, then processing proceeds to decision diamond 316 to determine whether a member in the FIFO trunk subgroup is available. If a member in the FIFO trunk subgroup is available, then processing proceeds to box 318 where a trunk member is removed from the head of the FIFO queue and the FIFO idle count is decremented. Processing proceeds to action box 320 where the seized member is linked to the tail of the busy FIFO list. Processing then proceeds to box 314 where success and the trunk group and member number is returned. If, in decision diamond 316, a FIFO trunk was not available, then in box 322 processing returns "trunks busy".

If, in decision diamond 306, it is determined that the FIFO subgroup has precedence, then a determination is made in decision 324 whether a FIFO trunk is available. If a FIFO trunk is available, then processing proceeds to action box 326 where the first trunk group member in the FIFO queue is removed and the FIFO idle count is decremented. Processing proceeds to action box 328 where the member is linked to the tail of the busy FIFO list. Processing then proceeds to action box 330 where success and the trunk group and member number is returned.

If there were no a FIFO trunks available in decision diamond 324, then processing proceeds to decision diamond 332 where a determination is made if a LIFO trunk is available. If there is, then processing proceeds to action box 334 where the head of the LIFO queue is removed and the LIFO idle count is decremented. Processing proceeds to action box 336, where the member is linked to the head of the busy LIFO list and processing returns successfully with the group and member number in action box 330. If a LIFO trunk was not available in decision diamond 332, then processing proceeds to action box 338, where trunks busy is returned.

Figure 4:
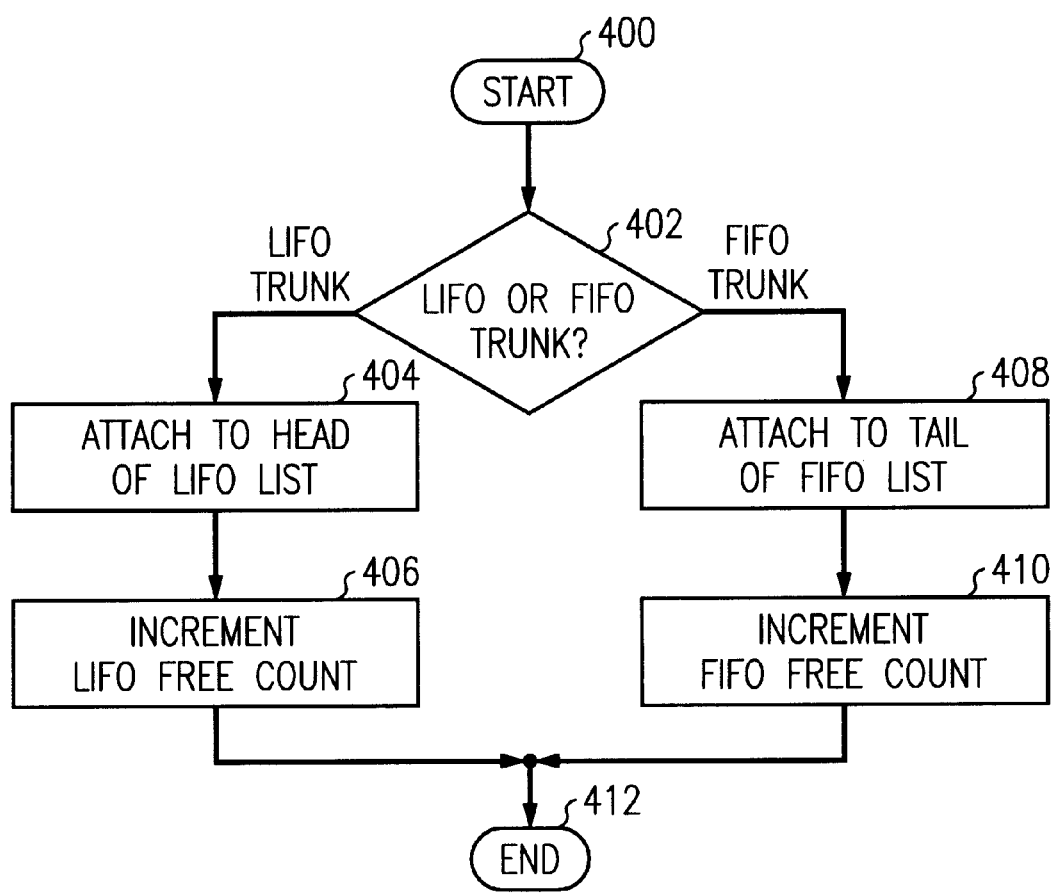

FIG. 4 shows action on deallocation (hang up). Processing starts in circle 400 and proceeds to decision diamond 402 where a determination is made if the trunk being deallocated is a LIFO or a FIFO trunk. If the trunk is a LIFO trunk, processing proceeds to action box 404 where it is attached to the head of the LIFO list, implying that it will be the first one selected the next time a trunk request occurs. Processing proceeds to action box 406 where the FIFO free count is incrementing and processing ends in circle 412.

If, in decision diamond 402, a determination is made that the member is a FIFO trunk, then processing proceeds to action box 408 where the member number is attached to the tail of the FIFO list and then in box 410 the FIFO free count is incremented. Processing ends at circle 412.

It is to be understood that the above-described embodiment is merely an illustrative principle of the invention and that many variations may be devised by those skilled in the art without departing from the scope of this invention. It is, therefore, intended that such variations be included within the scope of the claims.

What is claimed is:

1. A system for preventing glare between a first telephone switching system and a second telephone switching system connected by a plurality of trunk groups comprising a plurality of trunks organized into a plurality of subgroups, said system comprising:

a first processor in the first telephone switching system configured to hunt trunks from a first subgroup using a first algorithm and, if there are no available trunks in the first subgroup, to hunt trunks from a second subgroup using a second algorithm that is different from the first algorithm; and a second processor in the second telephone switching system configured to hunt trunks from the second subgroup using a third algorithm that is different from the first algorithm and, if there are no available trunks in the second subgroup, to hunt trunks from the first subgroup using a fourth algorithm that is different from the second and third algorithms;

wherein said first and second algorithms have an order of priority when both said first and said second processors seize the same trunk approximately simultaneously.

2. The system of claim 1 wherein said first algorithm comprises last-in-first-out (LIFO) and said fourth algorithm comprises first-in-first-out (FIFO), said first processor is configured to use LIFO on the first subgroup, and said second processor is configured to use FIFO on the second subgroup.

3. The system of claim 2 wherein second algorithm comprises FIFO and said third algorithm comprises LIFO.

4. The system of claim 1 wherein said processor is further configured to seize a trunk when using the first algorithm and to relinquish the trunk when using the second algorithm if the same trunk is seized by both switching systems at the same time.

5. The system of claim 1 wherein said processor is further configured to seize a trunk when using the third algorithm and to relinquish the trunk when using the fourth algorithm if the same trunk is seized by both switching systems at the same time.

6. A method for preventing glare between a first switching system and a second switching system connected by a trunk group divided into a plurality of subgroups, said method comprising the steps of:

receiving a call in the first switching system to be routed to the second switching system;

hunting a trunk to the second switching office from a first of the plurality of subgoups using a first algorithm;

hunting a trunk to the second switching office from a second of the plurality of subgroups using a second algorithm if there are no trunks available in the first of the plurality of subgroups;

receiving a call in the second switching system to be routed to the first switching system;

hunting a trunk to the first switching office from a first of the plurality of subgroups using a third algorithm that is different from said first algorithm;

hunting a trunk to the first switching office from a second of the plurality of subgroups using a fourth algorithm different from said second algorithm if there are no trunks available in the first of the plurality of subgroups;

if said first and second switching systems attempt to seize the same trunk at the same time, said first switching system determining which of said plurality of algorithms takes precedence, and if said first switching system seized said same trunk using an algorithm of higher precedence, said first switching system seizing said same trunk.

7. A method for preventing glare between a first switching system and a second switching system connected by a trunk group divided into a plurality of subgroups, said method comprising the steps of:

receiving a call in the first switching system to be routed to the second switching system;

hunting a trunk to the second switching office from a first of the plurality of subgroups using a first algorithm;

hunting a trunk to the second switching office from a second of the plurality of subgroups using a second algorithm if there are no trunks available in the first of the plurality of subgroups;

receiving a call in the second switching system to be routed to the first switching system;

hunting a trunk to the first switching office from a first of the plurality of subgroups using a third algorithm that is different from said first algorithm;

hunting a trunk to the first switching office from a second of the plurality of subgroups using a fourth algorithm different from said second algorithm if there are no trunks available in the first of the plurality of subgroups;

if said first and second switching systems attempt to seize the same trunk at the same time, said first switching system determining which of said plurality of algorithms takes precedence, and if said first switching system seized said same trunk using an algorithm of lower precedence, said first switching system relinquishing control of said same trunk.

* * * * *